United States Patent

[11] 3,610,863

| [72] | Inventor | Noel Fernand Doublet<br>La Croix Saint Leu, France |
|---|---|---|
| [21] | Appl. No. | 878,279 |
| [22] | Filed | Nov. 20, 1969 |
| [45] | Patented | Oct. 5, 1971 |
| [73] | Assignee | Societe Tubest<br>Paris, France |
| [32] | Priority | Nov. 20, 1968 |
| [33] | | France |
| [31] | | 174435 |

[54] APPARATUS FOR PREPARING THE EDGES OF THIN TUBES FOR WELDING
11 Claims, 8 Drawing Figs.

[52] U.S. Cl. .................................................. 219/59,
29/482, 219/105
[51] Int. Cl. ..................................................... B23k 31/06
[50] Field of Search ........................................... 219/59, 60,
61, 105, 62, 64, 67, 124, 125; 29/482; 228/6, 15, 17

[56] References Cited
UNITED STATES PATENTS

| 1,220,774 | 3/1917 | Murray.......................... | 219/67 |
| 1,417,126 | 5/1922 | Wunderlick.................... | 219/105 |
| 1,696,455 | 12/1928 | Rupley.......................... | 219/160 |
| 1,981,894 | 11/1934 | Adams........................... | 29/482 X |
| 2,306,945 | 12/1942 | Hebron......................... | 219/105 X |
| 3,017,494 | 1/1962 | Mackey......................... | 219/59 X |
| 3,075,484 | 1/1963 | Benteler........................ | 228/17 X |
| 3,287,536 | 11/1966 | Fay................................ | 219/62 |

Primary Examiner—J. V. Truhe
Assistant Examiner—L. A. Schutzman
Attorney—Greene & Durr ABSTRACT: Apparatus for the production of thin metal tubes comprises a forming device converting a strip of sheet metal into a split tubular blank having welding lips projecting outwardly from its meeting edges, and a welding device receiving and holding the blank and having a reciprocal welding electrode disposed above and movable along the adjoining welding lips, to produce a welding seam along the blank by step-by-step drawing of said strip from a supply roll through said forming and welding devices in succession and displacement of the welding electrode during its forward operating stroke along the blank and its intermittent stationary positions. The forming and welding devices are fitted with special forming dies and clamping means ensuring uniform welding lips and a consistent welding seam along the blank.

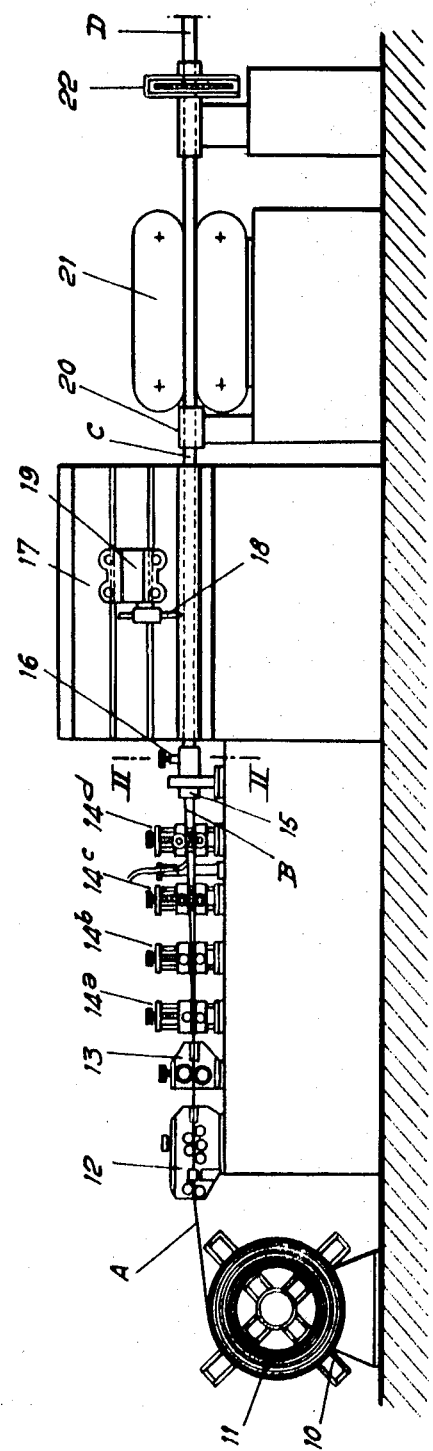

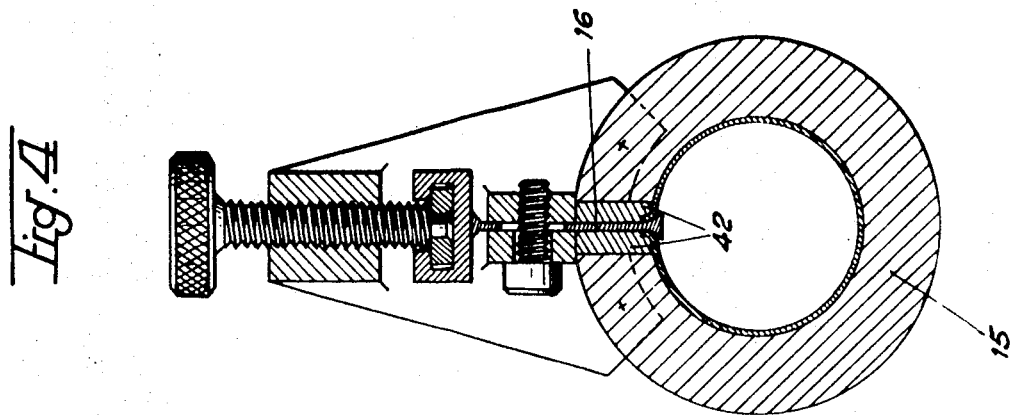
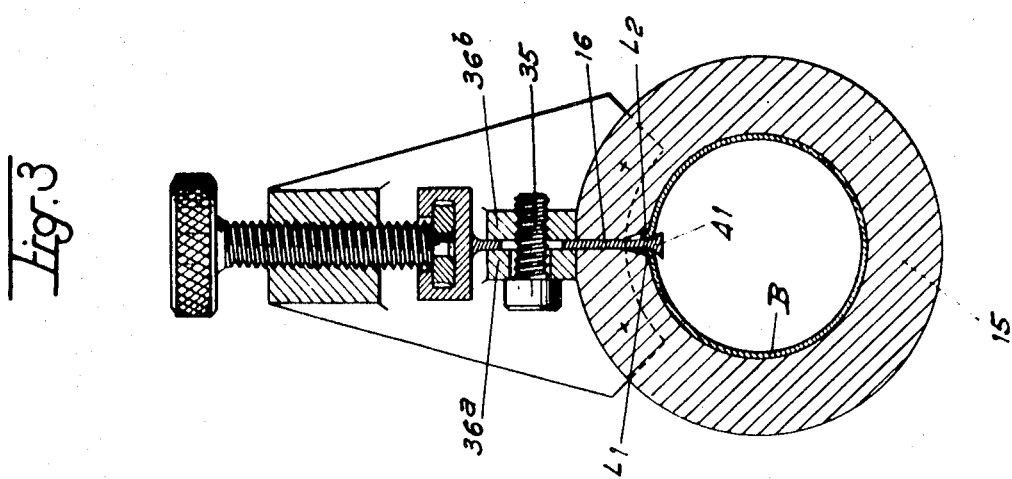
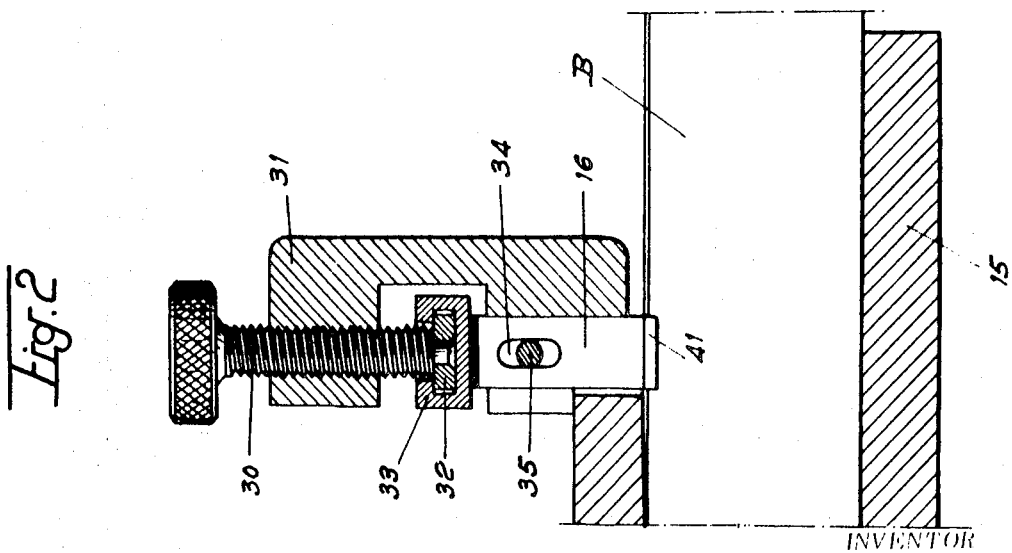

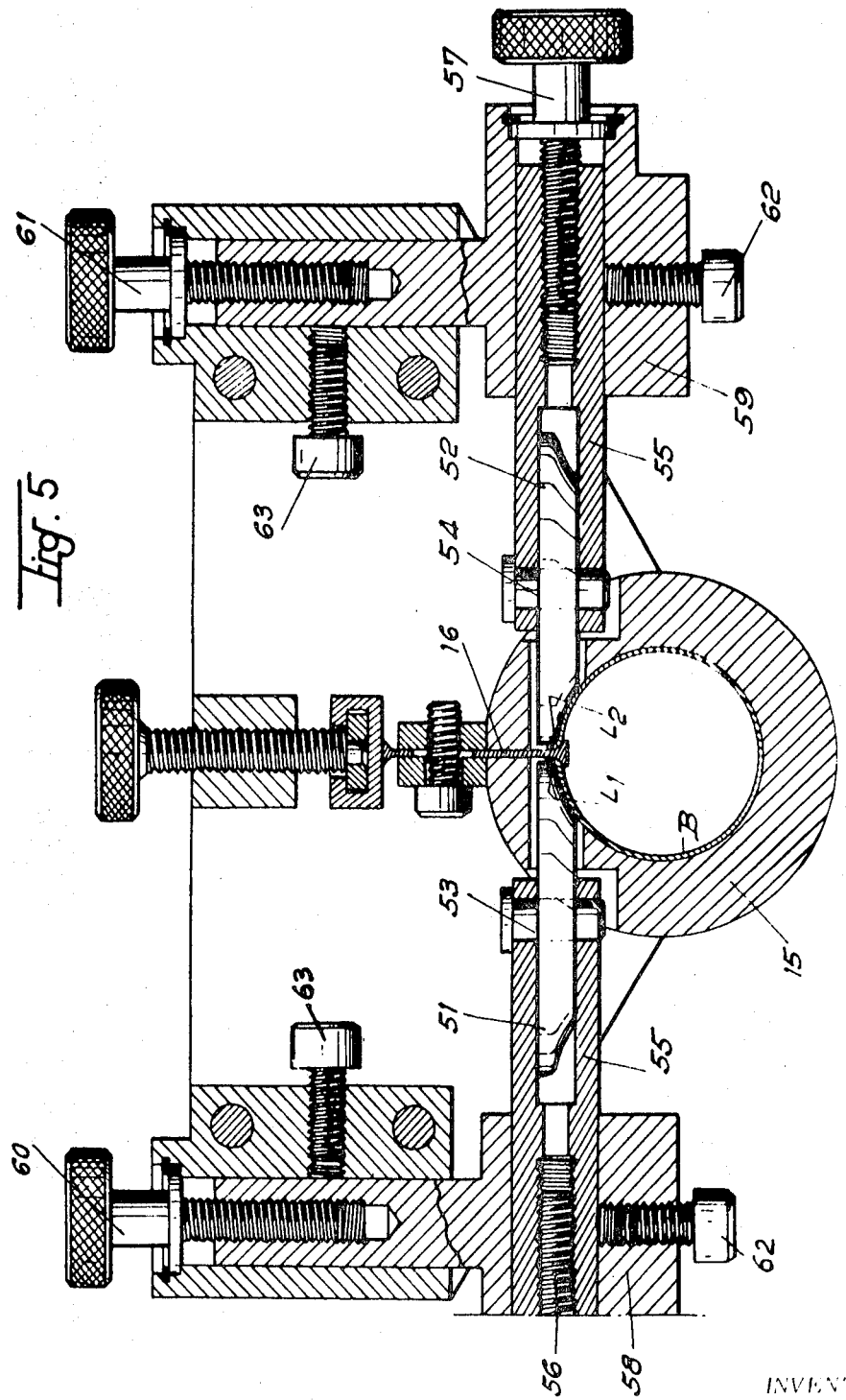

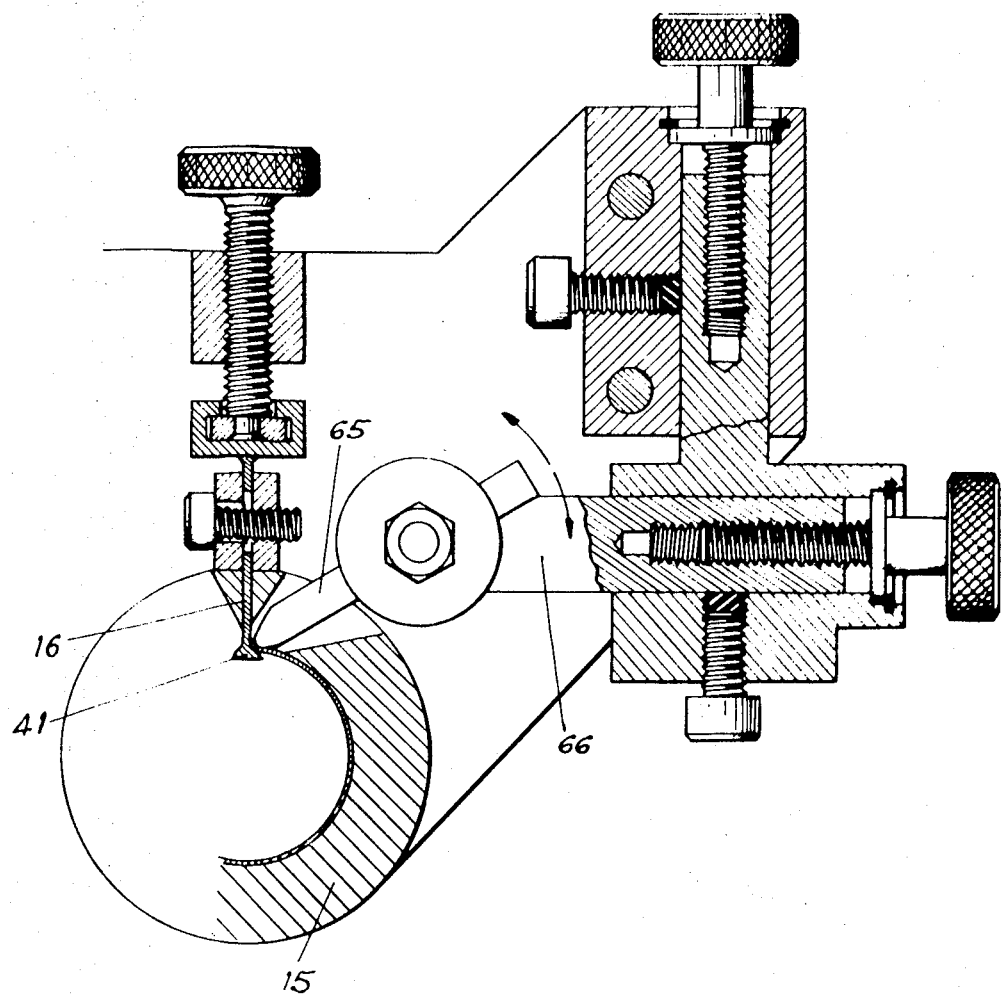

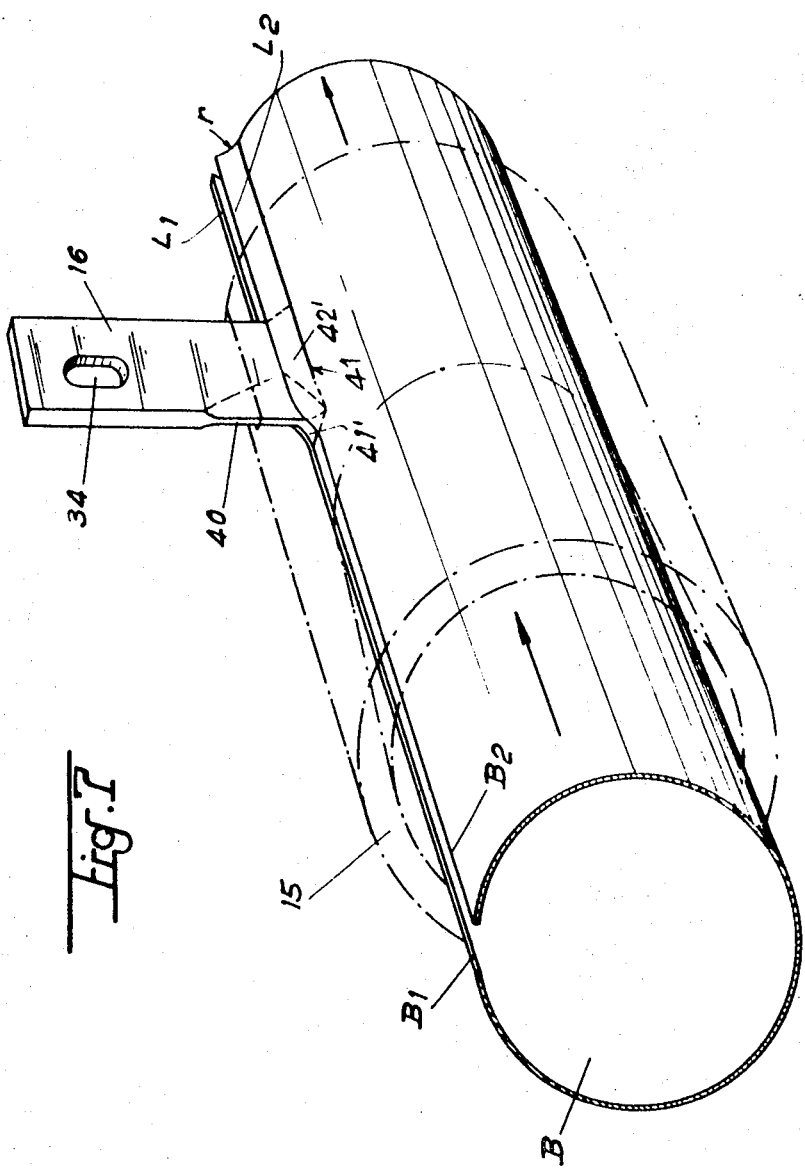

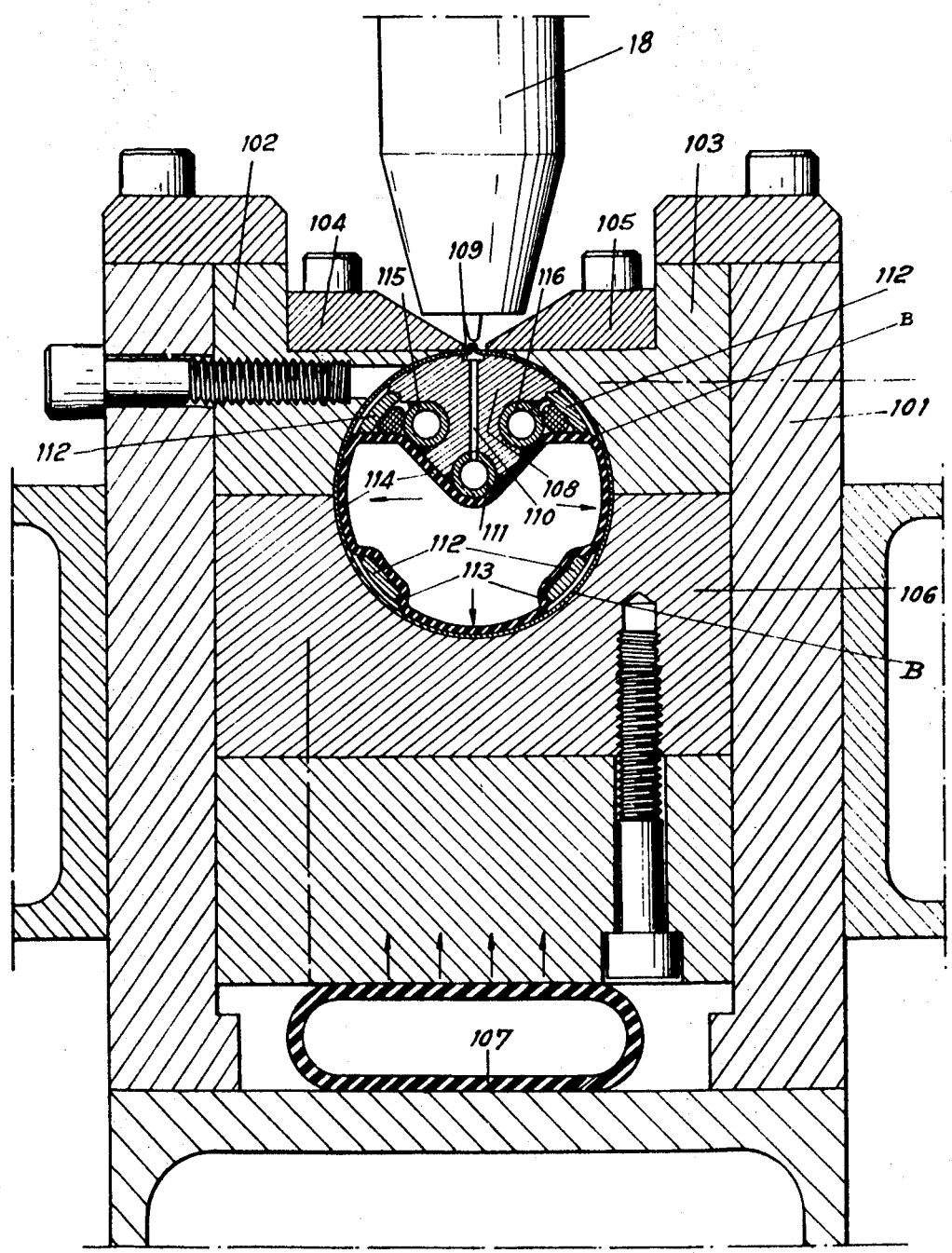

APPARATUS FOR PREPARING THE EDGES OF THIN TUBES FOR WELDING

The present invention relates to apparatus for producing thin metal tubes, more particularly by converting a strip of sheet metal drawn from a supply roll into a split tubular blank and subsequently welding the adjoining edges of said blank by a welding electrode displaceable along the seam to be produced.

In view of recent problems arising in chemistry, mechanics, physics, aviation, nuclear technology, etc., the production of thin or extra-thin metal tubes of precious metals possessing high-grade qualities, is of great importance in the industry.

According to applications, these tubes are employed in their initial shape (smooth tubes) or else are shaped, for example folded for use as flexible tubes in internal pressure or external pressure expansion compensators, bellows or thermostatic diaphragms, expansion joints, cryogenic assemblies, heat exchangers, condensers, protective casings, etc.

The properties generally required in practice for tubes of this type are the following: flexibility, hermeticity, resistance to high pressures, resistance to vacuum and hard vacuum, high temperature stability, low-temperature stability, mechanical strength, corrosion resistance, durability, and safety in use.

The present invention relates generally to a process for the production by welding of smooth tubes having thin walls or extra-thin walls which substantially fulfill the foregoing requirements and lend themselves particularly well to their conversion into undulated or corrugated tubes, particularly by a "hydroforming" process.

The tubes employed for this kind of production are essentially the following: tubes welded by means of rollers with overlapping of the edges, cold-drawn weldless (seamless) tubes, tubes welded edge to edge and redrawn, and, tubes welded edge to edge and calibrated.

The first are unsuited for shaping by hydroforming, owing to the overthickness formed by the overlapping of the edges and to the unsatisfactory properties of this kind of welding. Their application is not advisable moreover for mechanical shaping.

The seamless cold-drawn tubes and the tubes welded edge-to-edge and redrawn are acceptable for hydroforming but are of very high cost, since they require a sequence of operations to be repeated for each drawing operation, that is: descaling, lubricating, drawing, degreasing and annealing under vacuum or under a protective atmosphere. Moreover, the tubes welded edge to edge and redrawn entail risks of weakening of the welding seam owing to the final redrawing operation. Finally, the production lengths of these tubes are limited to 3 to 10 m. depending on cross section. This represents a handicap on the production of undulated tubes for example, where it is necessary to employ 5 to 6 m. of smooth tube to obtain 1 m. of undulated tube.

The tubes welded edge-to-edge and calibrated, comprising a longitudinal welding seam, are those forming the object of the present invention.

The qualities required should be available for the tube as a whole, inclusive of the welding seam. The tubes welded edge to edge and available in the trade crack or give at the weld under the hydroforming pressure. If the undulations or corrugations are formed mechanically, these tubes may barely withstand the forming action, but the advantages brought by hydroforming must then be renounced.

The invention is applicable to the production of tubes of metals which differ considerably, such as nonalloyed steels, copper, copper alloys, cupronickel, nickel-copper, Monel metal, Tombac, etc. ..., but it is of particular interest in application to the tubes of metals, for example stainless steel whose applications assume an ever-increasing importance.

For carrying out the process, a strip or sheet of cold-rolled metal wound in a reel passes, in a known manner, through a roller-equipped straightener, is then contingently calibrated precisely to the appropriate width by shearing of the margins, and thereafter fed into a line of forming rollers of a forming device in which it initially assumes the shape of a trough and then that of a split tubular blank.

The tube blank then passes through one or more dies or the like which serve the purpose of closing the tube and of allowing of its insertion into a welding device comprising displaceable jaws and a welding electrode, for example, appropriate for the application of the welding process known under the name T.I.G. (Tungsten Inert Gas), or microplasma. The intermittent entrainment of the tube is assured by a traction grapple or the like, at the output end of the welding device and the endless tube obtained is cut to the required length by means of an automatically controlled shear.

The invention essentially relates to producing a smooth welded tube of thin type having thin or extra-thin walls of very high quality, and appropriate in particular for subsequent exposure to substantial deformations, for example for is conversion into undulated or corrugated flexible tubes such as of ring or helical shape. It is necessary accordingly that, in this smooth tube which to some extent represents an intermediate product, the welding seam should possess mechanical properties practically identical to those of the actual wall of the tube, to withstand the substantial deformations required, without incurring damage. Moreover, the welding operation should not modify the physical characteristics of the metal of which the tube is made. Thanks to the means of the invention, the weld is free of any faults, even and perfectly hermetic. It is free from any "sprouting," splits, blow holes, depressions, deformations, pitting, or roughnesses.

In known manner, an appropriate protective gas like argon may be employed, being fed into the tube beneath the welding seam, according to the invention.

The invention essentially relates to particular means applied during the operation, and thanks to the application of which the weld obtained will possess considerably higher qualities than those it was possible to secure by means of the processes heretofore known in the art.

With the two edges to be welded being formed in such manner as to create on each of these a lip or flange directed towards the outside of the tube at right angles to its wall, the difficulties will be grasped which had to be overcome to produce such welding lips in an industrial process, without any deformation or damage of the edges of the strip, considering further that for the production of the tubes according to the process of the invention, whose diameter may vary between 6 mm. and 250 mm., the initial material employed consists of a strip or sheet whose thickness may vary between 0.03 and 0.7 mm. for example.

For this particular purpose, a special stationary forming tool is employed, inserted in the slot of the split tube, "upstream" of the welding point, and whose operating elements essentially consist of a vertical leading blade which separates the edges of the slot, said blade being combined with a lower horizontal boot which raises these edges so that they form the edges of the tube in step with its advance relative to the stationary forming tool within the die or the like guiding means.

Further, according to the invention, a hollow-cylindrical die is employed which is slotted longitudinally along its top generatrix, the two sides of its slot being shaped to cooperate with the boot for the forming of the welding lips or flanges.

In a variant embodiment, the parts of the die contributing to the forming of the lips are replaced by appropriately adjustable stationary forming tools.

In yet another variant of embodiment, rollers borne by the die play a part in the forming of the lips or flanges of the tube Applicant has observed that it is very important in practice, to ensure the required quality of the weld, for the electrode to be situated without fail precisely in the median plane of the joint during its displacement relative to the tube, to ensure uniform fusion of the edges. Faults arise such as perforations by fusion of one edge only, poor "bonding" of the welding bath, fusion of the metal beside the plane of the joint, etc., unless this condition is fulfilled.

A manually operated control of the transversal displacement of the electrode in order to keep the same centered on the line of the seam, despite possible deviations of the same, would require the concentrated and sustained attention of the operative, which is incompatible with continuous production on an industrial scale and with a constant quality of the product obtained.

For this purpose, the electrode may be arranged to be free in its transversal displacement and to be controlled in known manner by a mechanical device, for example of the roller type or electrical sensor type, or else of the photoelectric cell type, an example of automatic electrode alignment of this type being disclosed by my copending U.S. Pat. application entitled APPARATUS FOR AND METHOD OF PRODUCING RECTILINEAR WELDS Ser. No. 878,380 and filed on even date herewith.

Other features and objects of the invention will become apparent from the detailed description which will be consist leading given hereinafter of a welding apparatus appropriate for application of the process specified above, and illustrated in the accompanying drawings, in which:

FIG. 1 is a diagrammatical view in elevation of the different elements forming part of said apparatus.

FIG. 2 is a partial view of FIG. 1, to a larger scale, in longitudinal and vertical section, along the line II–II of FIG. 1.

FIG. 3 shows a cross section of FIG. 2.

FIG. 4 illustrates a variant embodiment of the device according to FIG. 3.

FIGS. 5 and 6 illustrate two other modified forms of this device, equally in cross section.

FIG. 7 is an explanatory diagram showing the operation of the forming tool embodied and employed according to the invention; and FIG. 8 is a view in cross section of the welding device forming part of FIG. 1.

Like reference characters denote like parts throughout the different views of the drawings.

Referring to FIG. 1, the apparatus shown comprises as its essential component elements a "turnstile" 10, receiving a storage reel or coil 11 which feeds a straightener 12 comprising rollers with the strip of cold-rolled sheet marked A, and which will be formed to produce the tube D. The strip A then passes, if necessary, through a side trimmer 13 which trims its edges, then into a line of forming rollers 14a, 14b, 14c, 14d which progressively raise its edges until a tubular shape has been imparted to it. The tube blank B thus obtained then passes into a tubular die 15 which is coordinated with a forming tool 16, these two elements being of special design according to the invention.

The tube blank B whose joint lips or flanges have been produced in the manner described in the following, by the combined action of the forming tool 16 of the die 15, or by ancillary elements coordinated therewith for this purpose then passes into the welding device marked 17, which may include the recording or trip, the sensor and the "tracer," as described in the referred to copending application, the welding electrode 18 being illustrated diagrammatically like its self-propelled carriage 19. The welded tube marked C then passes into a caliber head 20, at the egress of which it is gripped in the traction grapple or the like intermittent-feeding device 21 which ensures the step-by-step advance along the required length of the strip A of the blank B, and of the welded tube C through the mechanism as a whole. The tube C is then fed into a sectioning shear 22, the resultant sections D being collected in a storage device of optional form (not shown).

In order of their operation, the first of the component devices forming part of the invention is thus the forming tool 16 combined with the coordinated die 17. FIG. 7 diagrammatically illustrates its method of operation.

As has been set forth in the foregoing, the edges $B_1$, $B_2$, FIG. 7, of the tube blank B must be upset or raised to produce two welding lips or flanges $L_1$, $L_2$ of identical height whereof the clamping or contact will be assured by the die 15.

During the welding operation the lips $L_1$, $L_2$ provide a surplus of metal which, by acting as a feed metal, will eliminate the "gutter" in the completed weld. Clamping the lips is necessary on the other hand to ensure precise alignment, thanks to which the interfusion will occur without flow of metal in the slot.

As shown very will in FIG. 2, the shaping tool 16 is arranged fixedly but is adjustable in position in vertical direction by means of a micrometer screw 30 which is displaced in a guide 31 fastened to the extremity of the die 15 and whose shank carries at its extremity a disc 32 which turns in a cage 33 in unison with the upper extremity of the forming tool. This latter is perforated by a guide opening 34 traversed by a screw 35 which passes into two lugs 36a, 36b carried by the guide 31, at either side of the slot of the die, and which renders it possible to lock the tool 16 in its adjusted position (see FIG. 3). The lower corners of this slot are rounded off so that, during the displacement in the same of the blank tube B, the lips $L_1$, $L_2$ raised by the forming tool 16 are joined to the wall of the tube blank B according to the required curvature of the radius r FIG. 2.

The diagram of FIG. 7 adequately shows how the stationary forming tool 16 made of treated metal or tungsten carbide for example, generates the two lips $L_1$, $L_2$ in cooperation with the dies 15. On its leading edge, the tool comprises a thin crest 40 whose two sides extend rearwards at an angle until they rejoin the lateral plane parallel sides of the same. The crest or ridge 40 has its lower extremity joined to a foot or boot 41 whose leading face 41' and whose lateral faces 42' are oblique, and formed in such manner as to raise or upset the edges $B_1$, $B_2$ of the tube blank B which, after its passage abreast of the forming tool 16, will thus form the lips $L_1$, $L_2$.

FIG. 4 shows a variant embodiment of this device in which the part of the die 15 in which is wrought the passage slot for the forming tool 16 consists of two separate elements appropriate shape, such as of treated steel, marked 42. Thanks to a structure of this kind, higher wear-resistance is assured and, if the two elements 42 are interchangeable, they may be replaced conveniently, especially in order to modify the final shape imparted to the lips $L_1$, $L_2$.

In FIG. 5 has been illustrated a more developed variant embodiment in which the forming tool 16 and its fastening and setting means remain the same, but two pressing rollers 51, 52 are employed which turn freely on two spindles 53, 54 and whose peripheral configuration contributes to the forming of the lips $L_1$, $L_2$ in cooperation with the forming tool 16. This form of embodiment replaces the sliding friction between the tube blank and the die plate by a rolling friction which reduces the braking action on the blank in the device and reduces its wear.

The precise positioning of the two rollers 51, 52 is assured in the following manner. The two spindles 53, 54 are arranged in slideways 55 which are horizontally adjustable by means of micrometer screws 56, 57. These are mounted in yokes or the like 58, 59 which are also adjustable in vertical direction by means of further micrometer screws 60, 61. Setscrews like 62, 63 ensure the locking of the rollers 51, 52 at their adjusted position.

In FIG. 6, oblique tools 65 are adjustable in position on a lever 66, at either side of the forming tool. The position of this lever is precisely adjustable, in the horizontal as well as vertical directions, by the same means as those illustrated in FIG. 5 and described hereinbefore.

FIG. 8 illustrates the improved welding device according to the invention in cross section. It essentially comprises a frame marked 101 and two fixed jaws 102, 103, with wedges 104, 105. According to the invention, in view of the very small thickness and weakness of the tube blank B to be welded which does not have an adequate intrinsic rigidity, a displaceable jaw 106 forms a semicylindrical groove or "cradle" closely supporting the blank in the lower half of its section. In the same way, the two fixed jaws 102, 103 hold its upper half tight.

In known manner, the vertical displacement of the jaw 106 guided in the frame 101 is controlled by means of the jaw 106 guided in the frame 101 is controlled by means of a hydraulic or pneumatic expansible or inflatable tube 107.

According to the invention, a support 108 is also employed which has the purpose of providing effective protection of the welding seam against atmospheric air by distributing a protective gas, to prevent oxidization of the hot metal and the sinking of the fusion bath or perforation of the metal, to regularize the penetration of the molten metal to the base of the joint, and for firm application prior to welding, of the blank against the sides of the jaws 102, 103.

As is apparent, the bar 108 is positioned immediately below the welding seam. According to the invention it has wrought in its upper part of a groove 109 into which open ducts or passages 110 only on shown for supplying protective gas, arranged in appropriate numbers and positions, in such manner as to obtain a constant flow of protective gas along the entire bar. The bottom of the groove 109 may also be formed in any appropriate manner between the passage 110 to improve the uniform distribution of the gas. The passage 110 are fed from a metal tube 111 housed within the bar and extending throughout the length of the same, this tube appropriately being connected to a source of distribution of protective gas by suitable means (not illustrated).

Also, according to the invention, the support or bar 108 is housed in a rigid tube 112 having a slightly smaller outer diameter than the internal diameter of the blank B to be welded and which is formed with longitudinal openings 113 of appropriate size, shape and distribution, throughout its length. These openings have the purpose of allowing of the expansion beyond the side of the tube 112 of a resilient core 114 which, by acting against the inner side of the blank B, will ensure the clamping and depositioning of the blank in the jaws 102, 103, 106.

The core 114 is not inflated and consequently not in contact with the blank B unless the latter has been placed in the welding position. During its forward displacements it remains inscribed within the external diameter of the tube 112 and owing to this fact, not being in contact with the blank to be welded, it does not run the risk of being injured or rubbed by the same, thus causing removal of particles of the substance of which it consists, rubber for example, which would otherwise be separated by the action of friction of the metal and could penetrate under the welding seam. In the case of stainless steel for example, especially of very thin gauge, such contaminations by foreign bodies give rise to faulty welds, even if infinitesimal.

Two other tubes 115, 116 equally incorporated in the supporting bar 108, allow a circulation of a cooling fluid, such as a mixture of water and glycol for example, throughout its length. This cooling action improves the quality of the weld by ensuring absorption of the heat released.

The bar 108 will be made of a nonmagnetic alloy, such as copper or copper alloy, and then tube 112 may moreover receive a protective surface coating, for example by chromium plating, to prevent the entrainment of copper particles.

It will be understood that the supporting bar 108 wrought according to the invention and which forms a rigid assembly with the coordinated tube 112, will prevent any deformation of tube blank B during its displacements in the device, which renders it possible to ensure a precise positioning of the groove 109 relative to the welding joint, a correct distribution and an improvement in the effectiveness of the protective gas, the elimination of the risk of deterioration of the core 114 and the suppression of any danger of entrainment of particles from beneath the joint, during the welding operation.

The operational sequence of the welding device according to FIG. 8 is as follows: longitudinal displacement or pulling of the tube blank B into this device, with the core 114 deflated and the lower displaceable jaw 106 released, to guard this blank against any peripheral friction—applying low pressure in the core 114, to apply the blank B closely against the jaws 102, 103, 106—clamping the displaceable jaw 106 by expansion of the core 114 causing the aligned clamping of the lips $L_1$ and $L_3$ along the welding seam, without any risk of deforming the blank—final pressurization of the core 114, to lock the tube blank B in the jaws—performing the welding operation.

During these operations, the owing to the fact that the bar 108 is effectively supported and stiffened by the tube 112 whereof the ingress extremity can easily be secured in the frame 101, a perfect alignment will always be assured between its groove 109 and the welding seam. Accordingly, it does not incur the risk of coming into contact with the molten metal, owing to displacements of this groove, which would moreover cause a poor distribution and nonuniform spread of the gas, with the risk of failing to provide and effective protection of the back of the welding seam.

The bringing into action in appropriate sequence of the different elements of the apparatus, described and illustrated, for example by the opening and closing of the electrical circuits, the different feeds of protective gas and cooling liquid, the expansion and contraction of the expansible cores, etc. ..., may appropriately be controlled from a desk containing the appropriate mechanical pneumatic, hydraulic, electrical and electronic control equipment, whose embodiment will not offer any difficulty to one versed in the art, and which essentially remains outside the scope of the invention. This desk may evidently also be equipped with the manual control and checking elements needed for starting, adjusting supervising the operation and stopping the forming-and-welding apparatus.

As will be understood, the invention renders it possible to obtain tubes of high quality, welded edge to edge and of precise caliber, having thin or extra-thin walls, whereof the uniform welding seam offers mechanical properties in respect to elongation and tensile strength, as well as chemical characteristics of corrosion resistance, which are substantially equivalent to those of the metal from which they are formed. These tubes are characterized moreover by a high dimensional precision, a sufficient mechanical strength for their conversion by hydroforming, for example, into undulated or corrugated tubes, by a constant wall thickness, absolute hermeticity under hard vacuum (helium) and pressure, by highly satisfactory crystalline and macrographic properties, as well as a correct surface condition, free of striping and imprints.

Moreover, the smooth tubes produced according to the invention do not require any heat treatment or any mechanical operation, after they are welded. Their cost is distinctly lower than that of seamless drawn tubes and then that of redrawn welded tubes.

The invention permits the continuous automatic production in unlimited lengths, of tubes having thin or extra-thin walls. It is evidently applicable with the same advantages to the production of tubes of any cross section, and even of tubes of other cross section than a circular one, for example a polygonal cross section, subject to the technological modifications required for this purposes in the apparatus described and illustrated.

In operation after the strip or welded tube has been advanced by the device 21 by the predetermined operating stroke of the device, the welding carriage 19 (FIG. 1) is displaced from its starting position, to effect welding of the particular section of the blank B, whereupon the carriage is returned to the starting position ready for the next operating cycle. As is understood, the operations of both the carriage 19 and feeding device 21 are suitably coordinated or synchronized for effecting an automatic seam-welding operation. Advantageously, the advance or welding stroke of the carriage 19 slightly exceeds the feeding stroke of the device 21, to establish a small overlap between consecutive weld sections and to ensure a continuous or uninterrupted welding seam of the finished tubes.

In the foregoing, the invention has been described in reference to an illustrative or exemplary device. It will be evident, however, that variations and modifications, as well as the substitution of equivalent parts and devices for those shown herein for illustration, may be made without departing from the broader scope and spirit of the invention.

I claim:

1. Apparatus for the production of thin metal tubes by edge welding of a split tubular blank formed from a strip of sheet metal, comprising in combination 1. a lip-forming device for said blank comprising a stationary, horizontal, hollow cylindrical die having an internal diameter corresponding approximately to the tubular product to be formed and a stationary forming tool cooperating with said die,
2. a welding device in line with said lip-forming device and,
3. means to draw said blank step-by-step through said blank-forming device and into the region of said welding device, the hollow cylindrical die of the lip-forming device having a slit extending inwardly from the upstream end thereof and the stationary forming tool having a blade portion extending through said slit and a lower horizontal boot portion with outwardly flaring lateral faces, said hollow cylindrical die being constructed and arranged adjacent the region of said slit to cooperate with the stationary forming tool to form a pair of upwardly extending lips on a blank drawn through the lip-forming device, said welding device comprising a reciprocal welding electrode disposed above the lips of said blank, and aligning and clamping means for said blank disposed below the reciprocating region of said welding electrode to align the electrode path with the welding seam to be produced.

2. Apparatus as claimed in claim 1, wherein said welding device includes a support conforming to and engaging the inside surface of said blank in the welding position and having a duct therethrough terminating below the welding seam, for injecting an inert gaseous medium beneath said seam through said duct.

3. Apparatus as claimed in claim 2, wherein said support is formed with additional ducts for passing therethrough a cooling circulating fluid during welding.

4. Apparatus as claimed in claim 2, wherein said support has a groove in its upper part adjoining the welding seam, and means to supply an inert gaseous medium to said groove during welding.

5. Apparatus as claimed in claim 2, including a rigid horizontal supporting tube in part housing said support said tube having a stationary ingress extremity connected to the frame of the device, and an inflatable expansible core within the lower part of said tube, to lock the blank to the welding device.

6. Apparatus as claimed in claim 2, including a rigid horizontal supporting tube in part housing said support, said tube having a stationary ingress extremity connected to the frame of the device, and an inflatable expansible core within the lower part of said tube, to lock the blank to the welding device, said tube being perforated along its length by longitudinal openings, whereby said core, upon inflation, projects out of said tube and into contact with the internal wall of said blank for locking the same in the welding device, while allowing said blank to be drawn forward during deflation of said core 7. The apparatus as claimed in claim 1 wherein said aligning and clamping means includes a pair of stationary clamping jaws having wedges forming a gap for positioning the lips of the blank for welding and a lower clamping jaws whereby to closely envelop the outer cylindrical surface of said blank while welding the lips thereof.

8. The apparatus as claimed in claim 1 wherein the reciprocating stroke of the welding electrode exceeds the step-by-step advancing stroke of said blank.

9. The apparatus as claimed in claim 1 wherein the side walls of the slit cooperate with the boot of said forming tool to form the lips on said blank.

10. The apparatus as claimed in claim 7 wherein said die adjacent said slit area is formed of metal having high wear resistance.

11. The apparatus as claimed in claim 1, wherein said die comprises a pair of rollers mounted to rotate with their peripheries on opposite sides of said slot whereby said rollers cooperate with said stationary forming tool to form said lips.